United States Patent
Kitajima et al.

(10) Patent No.: US 12,000,422 B2
(45) Date of Patent: Jun. 4, 2024

(54) CRIMP SECURING STRUCTURE OF BOLT, CRIMP SECURING METHOD FOR CRIMP BOLT, AND CRIMPING DIE

(71) Applicant: AOYAMA SEISAKUSHO CO., LTD., Niwa-Gun (JP)

(72) Inventors: Dan Kitajima, Niwa-Gun (JP); Kazuhiro Koga, Niwa-Gun (JP); Yuichi Katsumata, Niwa-Gun (JP)

(73) Assignee: Aoyama Seisakusho Co., Ltd., Niwa-Gun (JP)

( * ) Notice: Subject to any disclaimer, the term of this patent is extended or adjusted under 35 U.S.C. 154(b) by 0 days.

(21) Appl. No.: 17/933,165

(22) Filed: Sep. 19, 2022

(65) Prior Publication Data
US 2023/0014756 A1    Jan. 19, 2023

Related U.S. Application Data

(63) Continuation of application No. PCT/JP2020/024098, filed on Jun. 19, 2020.

(51) Int. Cl.
*F16B 35/06* (2006.01)
*F16B 37/06* (2006.01)

(52) U.S. Cl.
CPC ............ *F16B 35/06* (2013.01); *F16B 37/068* (2013.01)

(58) Field of Classification Search
CPC .. F16B 5/04; F16B 19/04; F16B 35/06; F16B 37/041; F16B 37/044–045; F16B 37/068;
(Continued)

(56) References Cited

U.S. PATENT DOCUMENTS

| | | | | |
|---|---|---|---|---|
| 3,556,189 A | * | 1/1971 | Ernest | B23P 19/062 411/968 |
| 3,820,579 A | * | 6/1974 | Barry | F16B 37/068 411/176 |

(Continued)

FOREIGN PATENT DOCUMENTS

| DE | 197 10 246 A1 | 9/1998 |
|---|---|---|
| EP | 0 864 766 A1 | 9/1998 |

(Continued)

OTHER PUBLICATIONS

International Search Report and Written Opinion (Application No. PCT/JP2020/024098) dated Sep. 29, 2020 (with English translation).

(Continued)

*Primary Examiner* — Roberta S Delisle
(74) *Attorney, Agent, or Firm* — BURR PATENT LAW, PLLC

(57) ABSTRACT

Provided is a crimp securing structure of a bolt in which a crimp bolt 10 having a crimping recess 13 on the upper surface of the head is crimped onto a metal sheet 30. The thickness of a metal material press-fitted into the crimping recess 13 of the crimp bolt is made smaller at the peripheral edge of the crimping recess 13 and is made larger in the center portion thereof. In order to obtain this crimp securing structure, a crimping die 20 in which a stress-relief recess 23 is formed in a center portion of a convex portion is used to prevent the occurrence of excessive local stress in the crimping recess 13.

7 Claims, 8 Drawing Sheets

(58) Field of Classification Search
CPC ........ Y10S 411/967–968; Y10S 411/97; B23P 19/062
USPC ......... 411/172, 176, 179, 184, 500–501, 505
See application file for complete search history.

(56) References Cited

U.S. PATENT DOCUMENTS

| | | | |
|---|---|---|---|
| 5,020,950 A | 6/1991 | Ladouceur | |
| 6,108,893 A * | 8/2000 | Wojciechowski | B23P 19/062 29/432.1 |
| 6,146,072 A | 11/2000 | Müller | |
| 6,491,487 B1 * | 12/2002 | Wojciechowski | F16B 37/068 403/278 |
| 7,287,944 B2 * | 10/2007 | Ladouceur | B23P 19/062 411/181 |
| 8,366,364 B2 * | 2/2013 | Maloney | F16B 37/068 411/176 |
| 2002/0071736 A1 * | 6/2002 | Kando | F16B 37/068 411/107 |
| 2006/0204348 A1 * | 9/2006 | Shuart | F16B 37/068 411/107 |
| 2007/0098519 A1 * | 5/2007 | Kovac | F16B 37/065 411/176 |
| 2009/0196678 A1 * | 8/2009 | Babej | F16B 37/065 403/19 |
| 2010/0275433 A1 * | 11/2010 | Diehl | B23P 19/062 29/514 |
| 2011/0142566 A1 * | 6/2011 | Drexler | B23K 9/207 411/378 |
| 2013/0185917 A1 * | 7/2013 | Diehl | F16B 39/282 411/166 |
| 2018/0266475 A1 | 9/2018 | Hoshino et al. | |
| 2020/0300287 A1 | 9/2020 | Fujimoto et al. | |

FOREIGN PATENT DOCUMENTS

| | | |
|---|---|---|
| JP | H03-260407 A | 11/1991 |
| JP | H10-213108 A | 8/1998 |
| JP | 2004-324813 A | 11/2004 |
| JP | 2017-155860 A | 9/2017 |
| JP | 2019-138368 A | 8/2019 |

OTHER PUBLICATIONS

German Examination Report (Application No. 11 2020 007 083.2) dated Dec. 21, 2023 (with English translation) (14 pages).

* cited by examiner

CRIMP SECURING STRUCTURE OF BOLT, CRIMP SECURING METHOD FOR CRIMP BOLT, AND CRIMPING DIE

TECHNICAL FIELD

The present invention relates to a crimp securing structure of a bolt, a crimp securing method for a crimp bolt, and a crimping die.

BACKGROUND ART

Since the crimp bolt is a bolt for crimping the head of the bolt onto a metal sheet, it does not need to be heated unlike a welding bolt, thus not causing deformation or discoloration of the metal sheet, so the crimp bolt is widely used in industrial fields.

As disclosed in Patent Literature 1, general types of the crimp bolt are a type in which a crimping recess is formed in a head seating surface and a type in which a crimping recess is formed at the upper end of a shaft immediately below the seat surface. However, as disclosed in Patent Literature 3, a crimp bolt having a crimping recess on the upper surface of the head is also known.

In order to crimp the crimp bolt having the crimping recess on the upper surface of the head onto the metal sheet, a crimping die having a convex shape is placed on the back surface of the metal sheet, the crimp bolt is placed on the front surface of the metal sheet with the head facing downward, and the bolt head is pressed by a punch. At this time, the metal sheet is pressurized by the convex portion of the crimping die, the metal material is press-fitted into the crimping recess of the bolt, and the crimp securing is performed as illustrated in FIG. 8. The shaft of the crimp bolt crimped onto the metal sheet protrudes from the metal sheet and is therefore used to attach other members.

The metal material needs to plastically flow and fill in the crimping recess to crimp strongly. However, when the pressurizing force is increased for this purpose, there is then no place where the metal material, press-fitted into the crimping recess by the convex portion of the die, to flow, and excessive local stress may be generated in the crimping recess to deform or break the bolt head. In this case, the crimping strength is reduced. When the pressurizing force is reduced to avoid this phenomenon, the metal material cannot be press-fitted deep into the crimping recess, and the crimping strength is reduced. As described above, it has not been easy to firmly crimp the crimp bolt having the crimping recess on the upper surface of the head.

CITATIONS LIST

Patent Literature

Patent Literature 1: Japanese Unexamined Patent Application Publication No. 2017-155860
Patent Literature 2: Japanese Unexamined Patent Application Publication No. 2019-138368
Patent Literature 3: Japanese Unexamined Patent Application Publication No. 2004-324813

SUMMARY OF INVENTION

Technical Problems

Therefore, an object of the present invention is to solve the conventional problems described above and provide a bolt crimp securing structure, a crimp securing method for a crimp bolt, and a crimping die capable of firmly crimping a crimp bolt having a crimping recess on the upper surface of the head onto a metal sheet.

Solutions to Problems

A crimp securing structure of a bolt according to the present invention made to solve the above problems is a crimp securing structure of a bolt in which a crimp bolt is crimped onto a metal sheet. The crimp bolt has a crimping recess on an upper surface of a head of the crimp bolt, and a thickness of a metal material press-fitted into the crimping recess is made smaller at a peripheral edge of the crimping recess and is made larger in a center portion of the crimping recess.

A crimp securing method for a crimp bolt according to the present invention made to solve the above problems includes: placing a crimp bolt having a crimping recess on an upper surface of a head of the crimp bolt on a front surface of a metal sheet with the head facing downward; placing a crimping die having a convex portion on a surface of a die and a stress-relief recess formed in a center portion of the convex portion, on a back surface of the metal sheet; driving the crimp bolt into the metal sheet by a punch; and press-fitting a metal material into the crimping recess by the convex portion on the surface of the die. As described later, the shape of the stress-relief recess is not limited to a shape having a flat bottom surface, and various modifications can be made.

A crimping die according to the present invention made to solve the above problems is a crimping die used to crimp a crimp bolt having a crimping recess on an upper surface of a head of the crimp bolt onto a metal sheet. A convex portion is formed on a surface of the die, and a stress-relief recess is formed in a center portion of the convex portion.

Advantageous Effects of Invention

In the bolt crimp securing structure of the present invention, the thickness of the metal material press-fitted into the crimping recess formed on the upper surface of the head of the crimp bolt is made larger in the center portion of the crimping recess, and the press-fitting distance of the metal material in the center portion is made smaller than that at the peripheral edge. This allows the metal material to flow deep into the crimping recess, and moreover, reduces the press-fitting distance of the metal material in the center portion to prevent the occurrence of excessive local stress in the crimping recess. Therefore, the bolt head is not deformed or broken, which makes strong crimp securing possible.

Further, in the crimp securing method for a crimp bolt according to the present invention, crimping is performed using the punch and the crimping die having the stress-relief recess formed in the center portion of the convex portion, so that the metal material can be press-fitted deep into the crimping recess by the convex portion, and moreover, a part of the metal material press-fitted into the crimping recess is released into the stress-relief recess, whereby the occurrence of excessive local stress can be prevented. Therefore, the bolt head is not deformed or broken, which makes strong crimp securing possible.

DESCRIPTION OF EMBODIMENT

An embodiment of the present invention will be described below.

Figure 1:
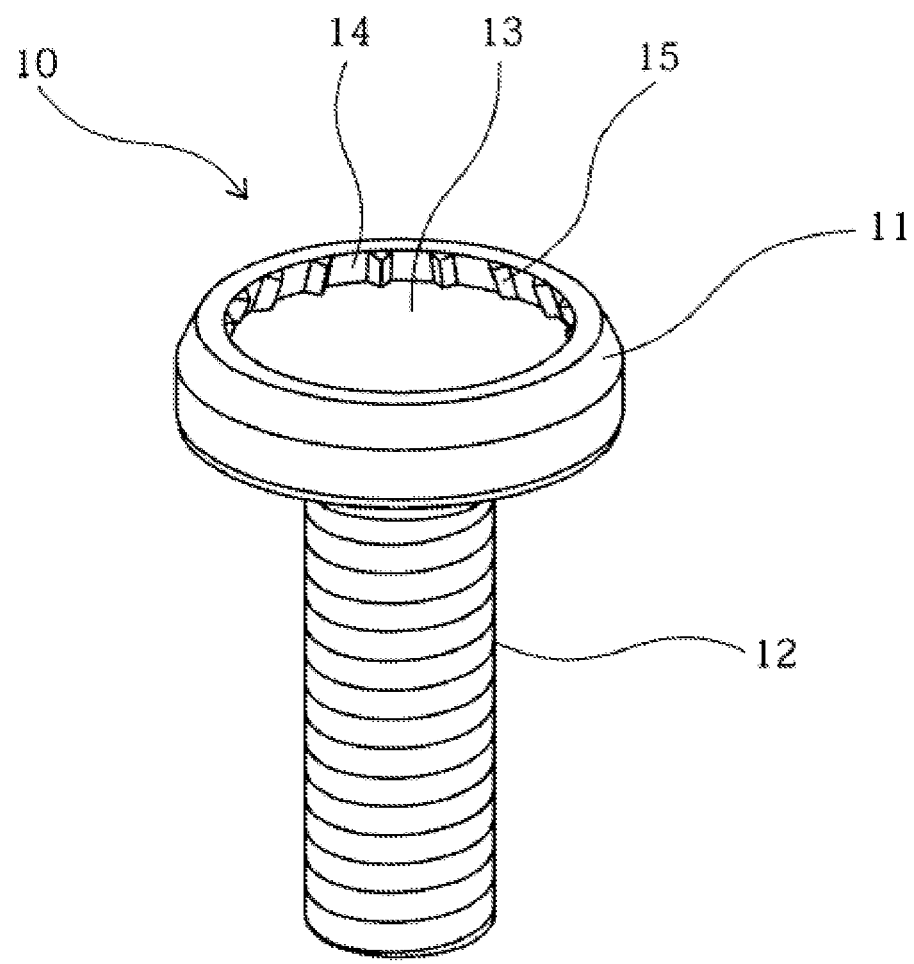
FIG. 1 is a perspective view of a crimp bolt.
Figure 2:
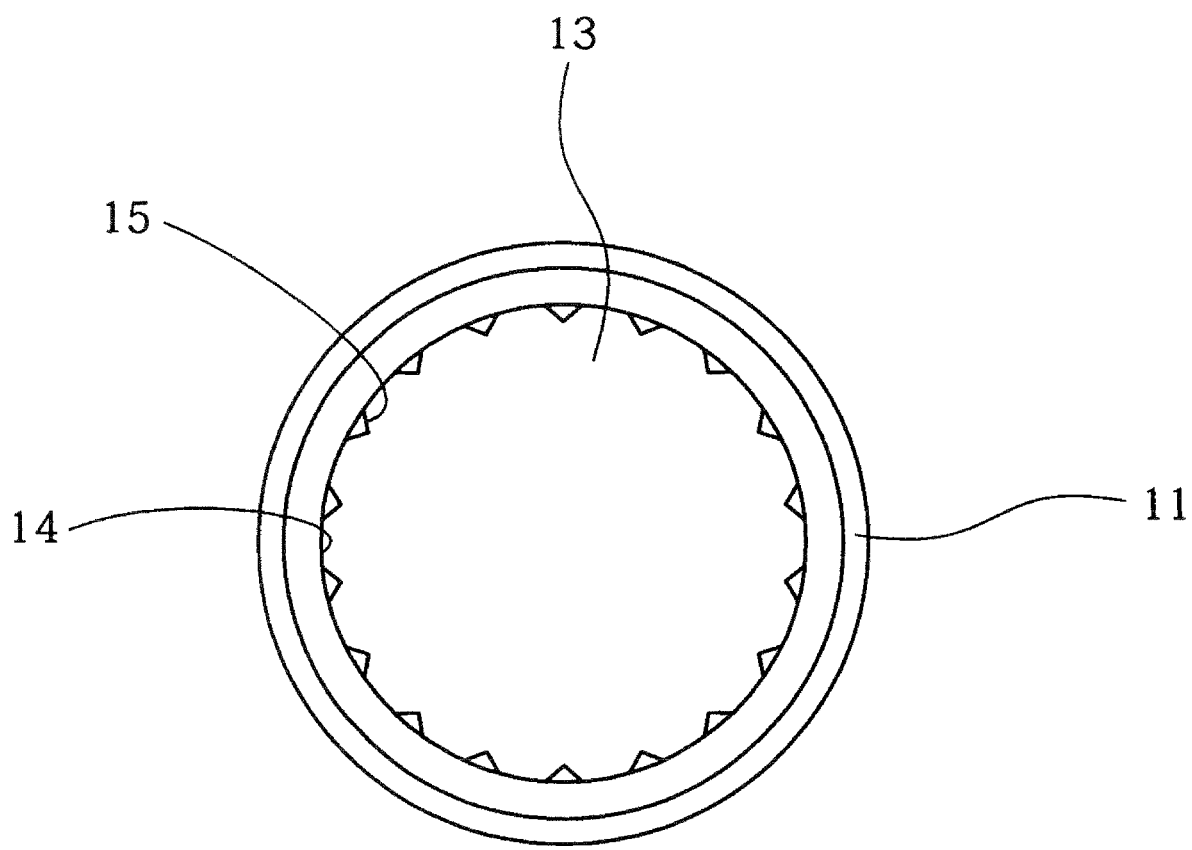
FIG. 2 is a top view of the crimp bolt.

FIG. 1 is a perspective view of a crimp bolt 10 used in the present embodiment, and FIG. 2 is a top view thereof. As illustrated in these drawings, the crimp bolt 10 has a head 11 and a shaft 12, and a crimping recess 13 is formed on the upper surface of the head 11. The bottom surface of the crimping recess 13 is a flat surface, and a peripheral inner surface 14 of the crimping recess 13 has a tapered shape expanding toward the bottom surface. An anti-rotation uneven portion 15 is formed on the peripheral inner surface 14 of the crimping recess 13.

Figure 3:
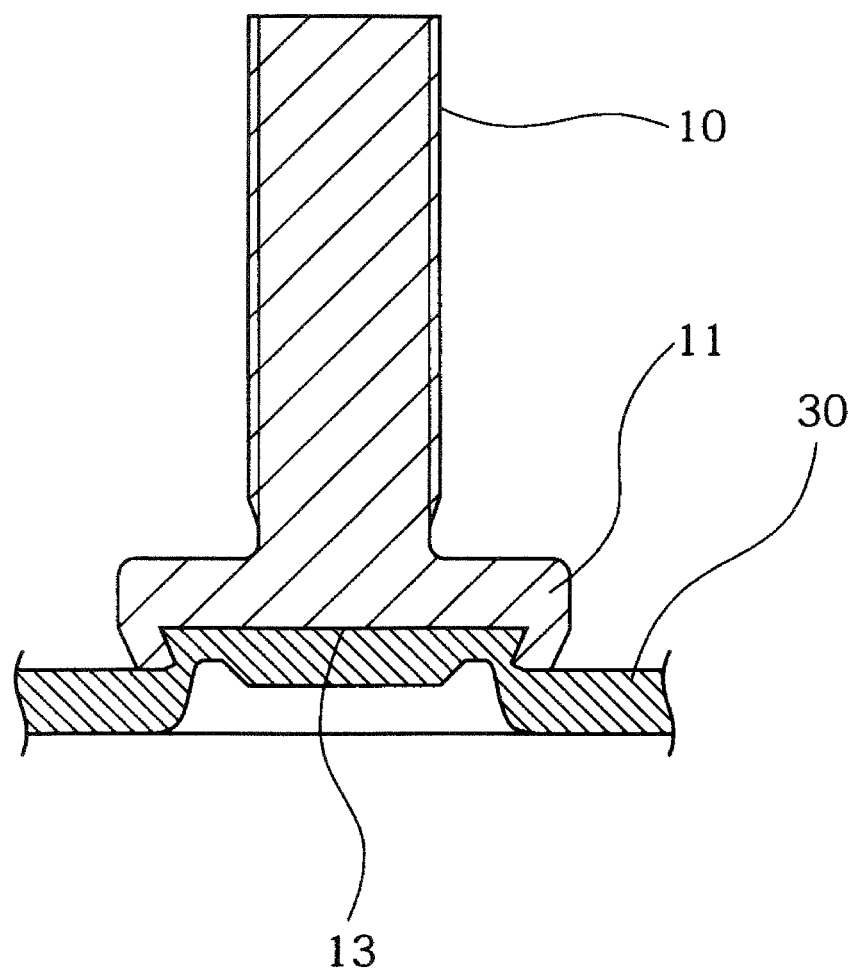
FIG. 3 is a cross-sectional view illustrating a crimping structure of a bolt according to an embodiment.

FIG. 3 illustrates a crimping structure in which the crimp bolt 10 is crimped onto the metal sheet 30. As illustrated in the drawing, the metal material of the metal sheet 30 is plastically press-fitted inside the crimping recess 13 of the crimp bolt 10, but the thickness of the metal material is smaller at the peripheral edge of the crimping recess 13 and is larger in the center portion thereof. That is, the metal material is deeply press-fitted at the peripheral edge of the crimping recess 13, thereby obtaining sufficient crimping strength. The metal material also bites into the anti-rotation uneven portion 15 formed on the peripheral inner surface 14 of the crimping recess 13 to obtain sufficient anti-rotation strength.

Figure 8:
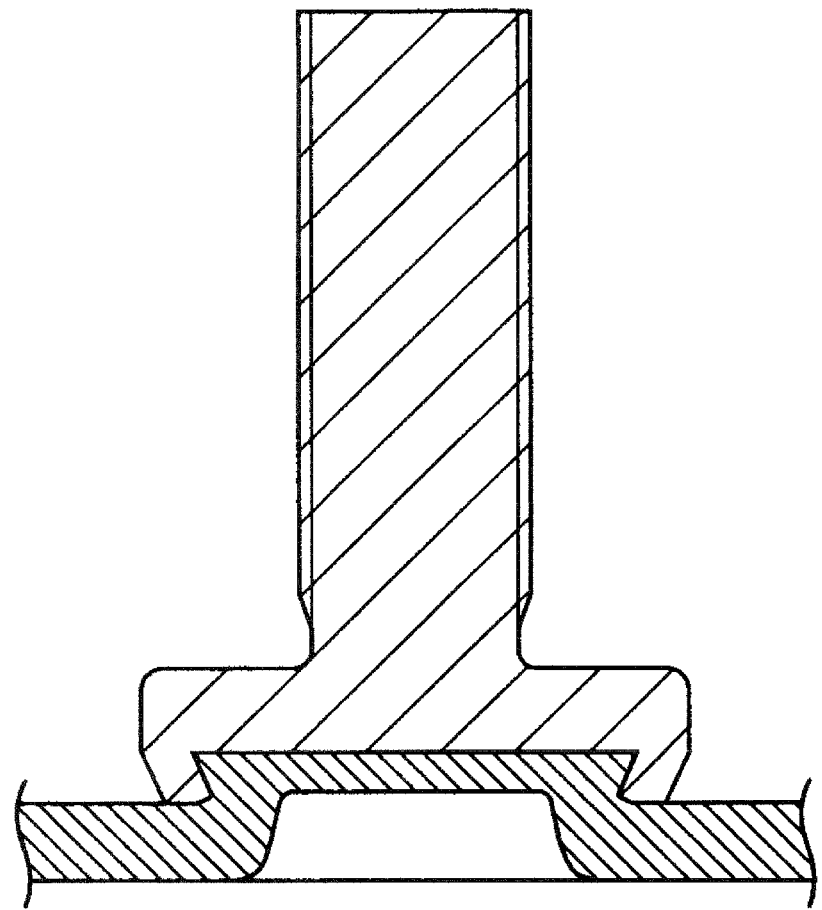
FIG. 8 is a cross-sectional view illustrating a conventional technique.

On the other hand, the press-fitting distance of the metal material is smaller in the center portion of the crimping recess 13 than at the peripheral edge. In a conventional structure illustrated in FIG. 8, the thickness of the metal material press-fitted into the crimping recess 13 is constant, and hence the crimping structure of the present invention is characterized in this point. By reducing the press-fitting distance of the metal material into the crimping recess 13 in this manner, the occurrence of excessive local stress in the crimping recess 13 is prevented. Therefore, the bolt head is not deformed or broken as in the conventional case, which makes strong crimp securing possible.

Figure 4:
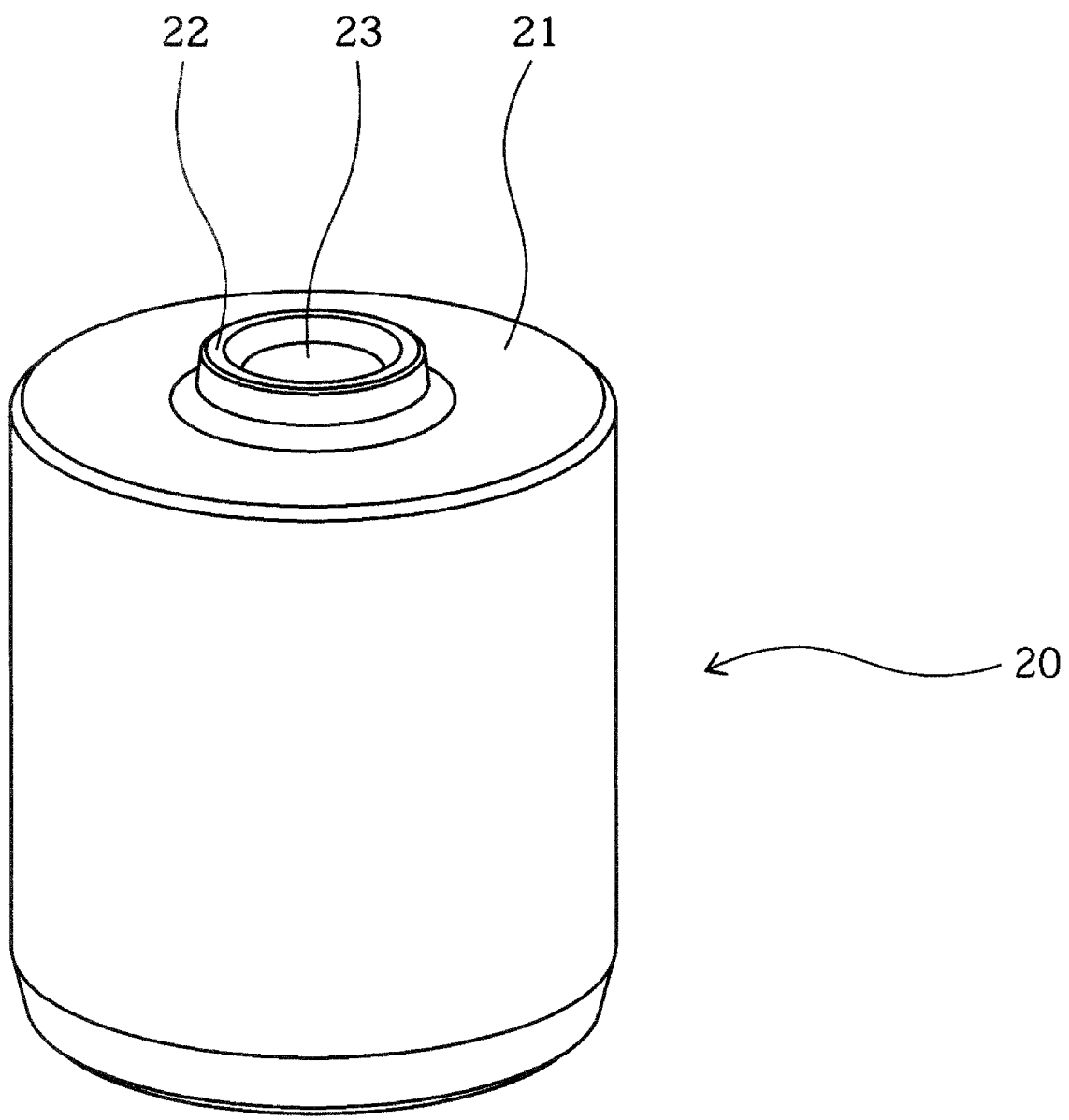
FIG. 4 is a perspective view of a crimping die.

Next, a crimp securing method for the crimp bolt according to the present invention will be described. In the crimp securing method, a special crimping die 20 as illustrated in FIG. 4 is used. The crimping die 20 is made of a hard metal, and a surface 21 of the top of its cylindrical main body is a flat surface, in the center portion of which a convex portion 22 having a circular shape is formed. The convex portion 22 has a role of press-fitting the metal sheet into the crimping recess 13 of the crimp bolt 10 to cause the metal material to flow plastically. Thus, the outer diameter of the convex portion 22 is formed to be smaller than the inner diameter of the crimping recess 13.

Figure 5:
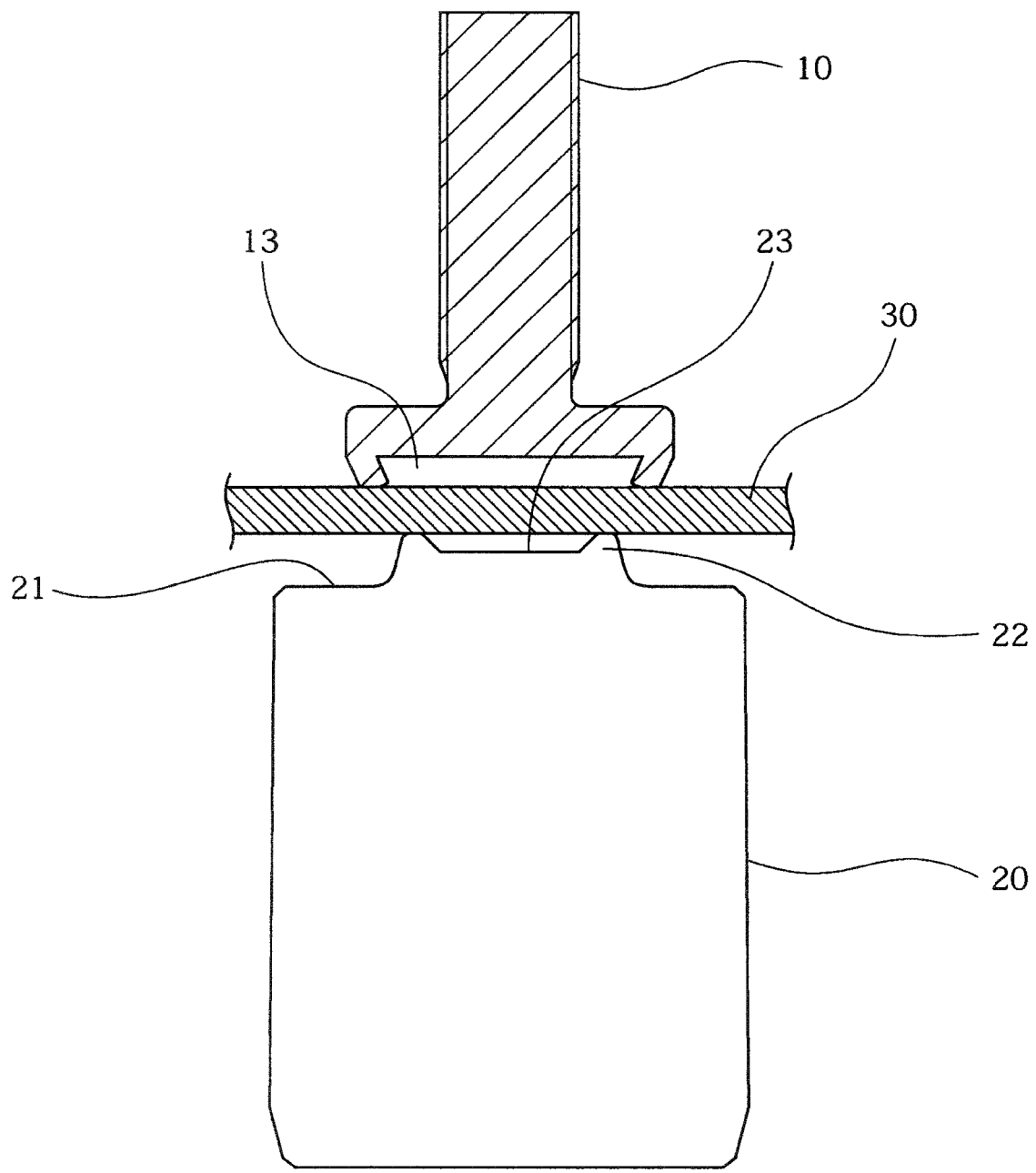
FIG. 5 is a cross-sectional view illustrating a state before crimping is started.

A stress-relief recess 23 is formed in the center portion of the convex portion 22. As illustrated in FIG. 5, in the present embodiment, the bottom surface of the stress-relief recess 23 is flat. The height of the bottom surface of the stress-relief recess 23 is intermediate between the heights of the surface 21 of the die and the convex portion 22. Specific dimensions are determined in accordance with the material and thickness of the metal sheet 30 as a mating material. Note that the shape of the stress-relief recess 23 is not limited to the shape having the flat bottom surface as in the present embodiment but may be, for example, a shape obtained by forming on the bottom surface a conical convex shape, a ring-shaped groove or protrusion, a trapezoidal protruding shape, or the like.

Figure 6:
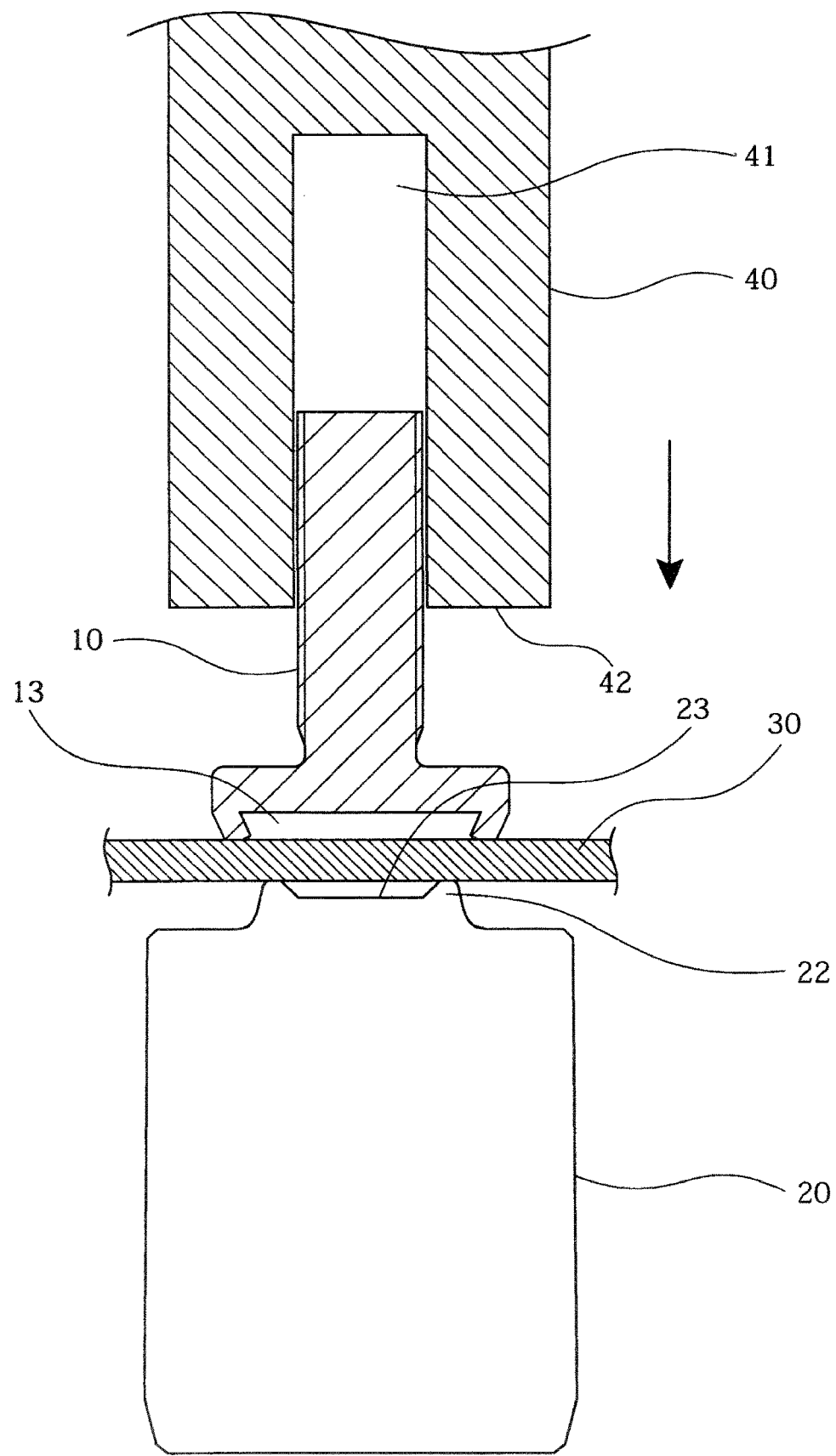
FIG. 6 is a cross-sectional view illustrating a state immediately before a punch is lowered.

In order to crimp the crimp bolt 10 onto the metal sheet 30 by using the crimping die 20 configured as described above, first, as illustrated in FIG. 5, the crimping die 20 is placed on the back surface of the metal sheet 30, and the crimp bolt 10 is placed on the front surface of the metal sheet 30 with the head facing downward. As in the conventional case, the crimping die 20 and the crimp bolt 10 are positioned so as to be on the same axis. In this state, the metal sheet 30 is on the convex portion 22 of the crimping die 20. Next, as illustrated in FIG. 6, a punch 40 is placed over the crimp bolt 10. A recess 41 into which the shaft 12 of the crimp bolt 10 is inserted is formed in the punch 40, and a flat surface 42 has a larger diameter than the head 11 of the crimp bolt 10.

Figure 7:
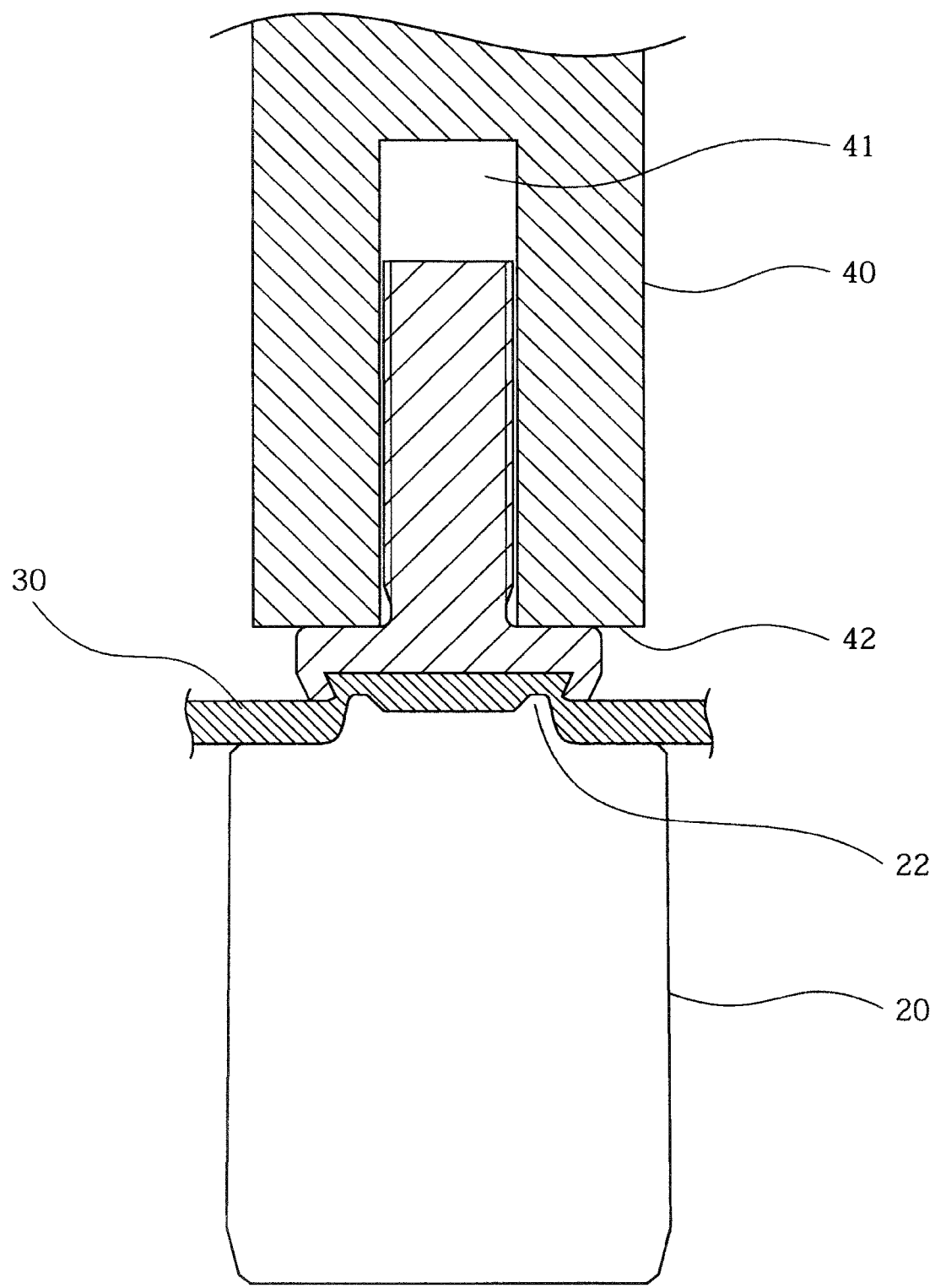
FIG. 7 is a cross-sectional view illustrating a state where the punch has been lowered.

From this state, the punch 40 is lowered as illustrated in FIG. 7, and the crimp bolt 10 is driven into the metal sheet 30. At this time, the metal material of the metal sheet is caused to plastically flow and is press-fitted into the crimping recess 13 of the crimp bolt 10 by the convex portion 22 on the surface of the die 20, and the crimp bolt 10 is crimped onto the metal sheet 30. As illustrated in FIG. 6, the metal material is press-fitted deep into the crimping recess 13 by the convex portion 22 having a circular shape of the die 20 and comes into close contact with the peripheral inner surface 14 of the tapered crimping recess 13 expanding toward the bottom surface and bites into the anti-rotation uneven portion 15. It is thereby possible to obtain excellent pull-out strength and anti-rotation strength.

At the time of the crimping, a part of the metal material flows into the stress-relief recess 23 formed in the center portion of the convex portion 22 of the die 20. As a result, the crimping structure of the present invention illustrated in FIG. 3 is obtained. According to the crimp securing method of the present invention, it is possible to prevent the occurrence of excessive local stress as compared with the case of using the conventional die without the stress-relief recess 23. Therefore, the bolt head is not deformed or broken, which makes strong crimp securing possible as illustrated in FIG. 3. The area and depth of the stress-relief recess 23 are determined in accordance with the material and thickness of the metal sheet 30. However, when the height of the bottom surface of the stress-relief recess 23 is set to be intermediate between the heights of the surface 21 of the die and the convex portion 22, the metal sheet 20 is reliably pressurized even in the center portion of the stress-relief recess 23, so that there is no possibility that the crimping strength decreases. The shaft 12 of the crimp bolt 10 is used for attaching other members.

As described above, according to the present invention, it is possible to obtain excellent crimping strength as compared with the case of using the conventional die having no stress-relief recess 23.

REFERENCE SIGNS LIST 10 crimp bolt
11 head
12 shaft 13 crimping recess
14 peripheral inner surface
15 anti-rotation uneven portion
20 crimping die
21 surface
22 convex portion
23 stress-relief recess
30 metal sheet
40 punch
41 recess
42 lower surface

The invention claimed is:

1. A crimp securing structure of a bolt in which a crimp bolt is crimped onto a metal sheet while the crimp bolt is not caused to penetrate the metal sheet, wherein
the crimp bolt has a crimping recess having a flat bottom surface on an upper surface of a head of the crimp bolt and a peripheral inner surface having a tapered shape expanding toward the flat bottom surface of the crimping recess, and
a thickness of a metal material press-fitted into the crimping recess is made smaller at a peripheral edge of the crimping recess and is made larger in a center portion of the crimping recess.

2. A crimp securing method for forming the crimp securing structure according to claim 1, the crimp securing method comprising:
placing the crimp bolt on a front surface of the metal sheet with the head facing downward;
placing a crimping die having a circular convex portion on and extending outwardly from a bottom surface of the die and a stress-relief recess formed in a center portion of the convex portion, on a back surface of the metal sheet;
driving the crimp bolt into the metal sheet by a punch while the crimp bolt is not caused to penetrate the metal sheet; and
press-fitting a metal material into the crimping recess by the convex portion on the surface of the die.

3. A crimping die used in the crimping securing method according to claim 2, comprising a convex portion having a circular shape formed on and extending outwardly from a bottom surface of the die, and a stress-relief recess formed in a center portion of the convex portion.

4. The crimping die of claim 3, wherein the shape of the bottom surface of the stress-relief recess is selected from the group consisting of flat, conical convex shape, ring-shaped groove or protrusion and trapezoidal protruding shape.

5. The crimping die of claim 4, wherein the shape of the bottom surface of the stress-relief recess is flat.

6. The crimping die of claim 5, wherein a height of the bottom surface of the stress-relief recess is intermediate between a height of the bottom surface of the die and a height of the circular convex portion.

7. The crimp securing structure according to claim 1, wherein the crimp bolt further includes an anti-rotation uneven portion formed on the peripheral inner surface of the crimping recess.

* * * * *